US012791739B2

(12) United States Patent
Arnquist et al.

(10) Patent No.: US 12,791,739 B2
(45) Date of Patent: Nov. 10, 2026

(54) METHOD FOR PURIFICATION AND REMOVAL OF POTASSIUM FROM NONPOLAR AND SURFACTANT SOLUTIONS AND MIXTURES

(71) Applicant: Battelle Memorial Institute, Richland, WA (US)

(72) Inventors: Isaac J. Arnquist, Richland, WA (US); Maria Laura Di Vacri, Richland, WA (US); Nicole D. Rocco, Richland, WA (US); Amanda D. French, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 214 days.

(21) Appl. No.: 18/696,234

(22) PCT Filed: Sep. 29, 2022

(86) PCT No.: PCT/US2022/045290
§ 371 (c)(1),
(2) Date: Mar. 27, 2024

(87) PCT Pub. No.: WO2023/055975
PCT Pub. Date: Apr. 6, 2023

(65) Prior Publication Data

US 2024/0385337 A1 Nov. 21, 2024

Related U.S. Application Data

(60) Provisional application No. 63/249,900, filed on Sep. 29, 2021.

(51) Int. Cl.
*G01T 1/204* (2006.01)
*B01D 15/36* (2006.01)

(52) U.S. Cl.
CPC .......... *G01T 1/2042* (2013.01); *B01D 15/361* (2013.01); *G01T 1/204* (2013.01); *G01T 1/2047* (2013.01)

(58) Field of Classification Search
CPC ........... G01T 1/02; G01T 1/16; G01T 1/1606; G01T 1/204; G01T 1/2042; G01T 1/2047; G01T 1/29; G01T 1/2907; G01T 1/2914
(Continued)

(56) References Cited

U.S. PATENT DOCUMENTS 3,650,973 A * 3/1972 Maeder ................ G01T 1/2042
250/362
3,666,683 A * 5/1972 Maeder ................ G01T 1/2042
252/301.17
(Continued)

FOREIGN PATENT DOCUMENTS

WO 1985005460 A1 12/1985

OTHER PUBLICATIONS

Y. Kobayashi et al., Liquid Scintillation Analysis, Michael J. Kessler, Ph.D., Editor, Revvity 2025. (Year: 2025).*
(Continued)

*Primary Examiner* — Allen C. Ho
(74) *Attorney, Agent, or Firm* — Derek H. Maughan; Frank Rosenberg

(57) ABSTRACT

Detection of radiation in environmental samples is commonly conducted in liquid scintillation counters. Both commercial-off-the-shelf detectors and custom-built ultralow background counters are limited by the radiopurity of the liquid scintillation cocktails themselves, most specifically from $^{40}K$, an environmental radioisotope of potassium. Major radioactive contaminants are $^{40}K$, $^{232}Th$ and $^{238}U$ (and their decay chain progeny). $^{40}K$ is a naturally occurring radioisotope in the environment and can interfere with the
(Continued)

sensitivity of analytical instruments. The invention provides a method for purification and removal of potassium ($^{40}K$) from liquid scintillation cocktails. nonpolar and surfactant solutions and mixtures, thereby reducing the abundance of $^{40}K$ from the scintillating cocktail and improving sensitivity of analytical instruments.

13 Claims, 1 Drawing Sheet

(58) Field of Classification Search
USPC ........... 250/361 R, 362, 472.1, 473.1, 483.1, 250/484.4, 484.5; 378/82, 98
See application file for complete search history.

(56) References Cited

U.S. PATENT DOCUMENTS

| | | | | |
|---|---|---|---|---|
| 3,676,360 A * | 7/1972 | Shamoo | G01T 1/2042 | 250/483.1 |
| 3,711,421 A * | 1/1973 | Krumbiegel | G01T 1/2042 | 250/483.1 |
| 3,935,449 A * | 1/1976 | Reunanen | G01T 1/2047 | 250/252.1 |
| 3,939,094 A * | 2/1976 | Kauffman | G01T 1/2042 | 568/624 |
| 4,001,139 A * | 1/1977 | Long | G01T 1/2042 | 250/362 |
| 4,021,670 A * | 5/1977 | Noakes | G01T 1/204 | 250/328 |
| 4,651,006 A * | 3/1987 | Valenta | G01T 1/204 | 250/363.01 |
| 4,661,705 A * | 4/1987 | Horrocks | G01T 1/2045 | 250/369 |
| 4,692,266 A * | 9/1987 | Costa | G01T 1/204 | 250/361 R |
| 4,812,648 A * | 3/1989 | Perlman | G01T 7/02 | 250/DIG. 2 |
| 4,920,269 A * | 4/1990 | Perlman | G01T 1/204 | 250/361 R |
| 4,920,270 A * | 4/1990 | Grodzins | G01T 1/178 | 250/DIG. 2 |
| 5,146,093 A * | 9/1992 | Valenta | G01T 1/172 | 250/362 |
| 5,198,364 A * | 3/1993 | Oikari | G01T 1/203 | 250/328 |
| 5,308,544 A * | 5/1994 | Dodson | G01T 1/2042 | 252/301.16 |
| 7,126,148 B2 * | 10/2006 | Murray | G01T 3/06 | 250/269.4 |
| 7,294,286 B2 * | 11/2007 | Rodriguez Barquero | G01T 1/2042 | 252/301.17 |
| 11,598,887 B2 * | 3/2023 | Bae | G01T 1/204 | |
| 11,940,574 B2 * | 3/2024 | Scherer | G01T 1/02 | |

OTHER PUBLICATIONS

Alessandro Carlini et al., A methodology for alpha particles identification in liquid scintillation using a cost-efficient Artificial Neural Network, Nuclear Instruments and Methods in Physics Research A 1064 (2024) 169369. (Year: 2024).*
Buck, C., & Yeh, M. "Metal-loaded organic scintillators for neutrino physics", Journal of Physics G: Nuclear and Particle Physics, 43(9) (2016) 093001.
Benson, R. H. "Characteristics of solgel scintillators for liquid scintillation counting of aqueous and non-aqueous samples", The International Journal of Applied Radiation and Isotopes, 27(12) (1976) 667-674.
International Preliminary Examination Report on Patentability from International Application No. PCT/US2022/045290 dated Apr. 2, 2024.
Written Opinion of the International Search Authority from International Application No. PCT/US2022/045290 date of mailing Jan. 17, 2023.

* cited by examiner

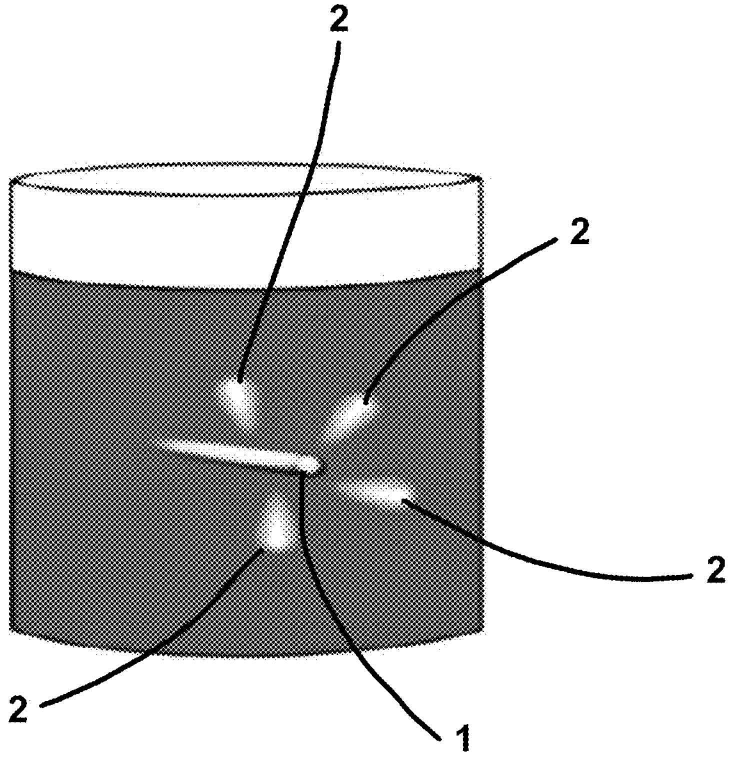
2
2
2
2
1

METHOD FOR PURIFICATION AND REMOVAL OF POTASSIUM FROM NONPOLAR AND SURFACTANT SOLUTIONS AND MIXTURES

RELATED APPLICATIONS

This application is a 371 of International Application No. PCT/US22/45290, filed on 29 Sep. 2022 which claims the priority benefit of US Provisional Patent Application Ser. No. 63/249,900 filed 29 Sep. 2021.

GOVERNMENT RIGHTS

This invention was made with Government support under Contract DE-AC0576RL01830 awarded by the U.S. Department of Energy. The Government has certain rights in the invention.

INTRODUCTION

The invention relates to improvements in the detection of radioactive isotopes via liquid scintillation counting by removing background contributors intrinsic in the scintillation media. In liquid scintillation, a sample is incorporated into a liquid scintillation cocktail and the cocktail is placed in a liquid scintillation counter that is shielded from the environment. A schematic illustration of a liquid scintillation cocktail is shown in FIG. 1 where beta and alpha particle emissions 1 produced by a radioactive material impact a scintillator which emits photons 2. Photons from the scintillation are detected by a photomultiplier and used to determine concentrations of radioisotopes in the sample.

The sample to be tested can be in an aqueous or organic phase. In many cases, a surfactant is used to increase acceptance of an aqueous phase in an organic solvent. The liquid scintillation cocktail typically includes a solvent, a surfactant, and a scintillator that emits a photon(s) when struck by a beta particle.

SUMMARY OF THE INVENTION

Both commercial-off-the-shelf detectors and custom-built ultralow background counters can be limited in detection sensitivity by the radiopurity of the liquid scintillation cocktails themselves, most specifically from $^{40}$K, a long-lived naturally occurring radioisotope of potassium. Other radioactive contaminants common in the environment include $^{232}$Th and $^{238}$U and their decay chain progeny.

The invention provides a method for purification and removal of potassium ($^{40}$K) from liquid scintillation cocktails, nonpolar and surfactant solutions and mixtures, thereby reducing the abundance of $^{40}$K from the scintillating cocktail and improving sensitivity of analytical measurements.

In one aspect, the invention provides a method of making a liquid scintillation cocktail, comprising: treating one or more liquid components of a liquid scintillation cocktail with a solid material; wherein the liquid components comprise a solvent and a surfactant; wherein the solid material adsorbs potassium from the one or more liquid components; and separating the solid material from the one or more liquid components.

In another aspect, the invention provides a method of measuring alpha particle or beta particles emitted from a sample by liquid scintillation, comprising: providing a liquid scintillation cocktail or component of a liquid scintillation cocktail; treating the liquid scintillation cocktail or component of a liquid scintillation cocktail with a solid potassium absorber to form a treated liquid scintillation cocktail or component of a liquid scintillation cocktail; adding a radioactive sample to the treated liquid scintillation cocktail or component of a liquid scintillation cocktail and forming a liquid scintillation cocktail with incorporated sample; and counting particles emitted by the sample in the liquid scintillation cocktail with incorporated sample in a scintillation counter. Preferably, the liquid scintillation cocktail or component of a liquid scintillation cocktail in the providing step comprises at least 2 mass % of a surfactant.

In a further aspect, the invention provides a method of measuring alpha particle or beta particles emitted from a plurality of samples by liquid scintillation, comprising: counting particles emitted by a first sample in a liquid scintillation cocktail with incorporated first sample in a scintillation counter; subsequent to the step of counting, treating the liquid scintillation cocktail with incorporated first sample with a solid potassium absorber to form a treated liquid scintillation cocktail; separating the solid potassium absorber from the treated liquid scintillation cocktail; combining a second sample to the treated liquid scintillation cocktail, and counting particles emitted by a second sample in the liquid scintillation cocktail with incorporated second sample in a scintillation counter.

In any of the inventive aspects, the invention may be further characterized by one or more of the following: wherein the liquid components further comprise a scintillator; wherein the cocktail further comprises a wavelength shifter; where the solid material comprises an ion exchange resin or zeolite; where the solid material comprises a sodium or alkaline earth silicate; where the step of removing potassium reduces the concentration of potassium by at least 10 times or in the range of 10 to 50 times or 10 to 40 times; wherein the liquid scintillation cocktail or component of a liquid scintillation cocktail in the providing step comprises a surfactant, or at least 2 mass % or at least 5 mass % of a surfactant.

The potassium removal method described herein is easy to implement and effective on cocktails and the individual reagents that make up the cocktails. Moreover, the method described herein can more effectively remove potassium than other methods to lower levels in a more streamlined fashion that involves very few production steps. Conversely, more conventional purification methods (e.g., distillation, liquid-liquid extraction, etc.) are much less straightforward and/or not possible, particularly on the finished cocktail products. Other methods usually include sourcing purer stock reagents to start from, which may be more expensive and vary from lot-to-lot. The method described herein may enable manufacturers to start with lower grade reagents and purify to sufficient levels later, and/or remove other purification steps that are more time and energy intensive, which may result in cost and time benefits.

BRIEF DESCRIPTION OF THE DRAWINGS

FIG. 1 schematically illustrates scintillation in a liquid.

DETAILED DESCRIPTION OF THE INVENTION

The invention is useful in the measurement of radioactivity by reducing pernicious background sources of radiation from naturally-occurring radioisotopes in the environment (e.g. $^{40}$K). Typically, samples are taken from the environment and mixed into a liquid scintillation cocktail. The material to be analyzed can be, for example, groundwater, river water, medical or other biological samples, runoff, soil, concrete, etc. The material can be processed into a solution and the resulting solution combined into a liquid scintillation cocktail. Alternatively, material can be mixed with a liquid scintillation cocktail, optionally subjected to a step of solids separation or other treatment, and the resulting liquid scintillation cocktail placed into a liquid scintillation counter to measure radioactivity in the sample.

Prior to combining the material to be analyzed into the liquid scintillation cocktail, the liquid scintillation cocktail is treated with a solid potassium adsorber in order to remove the pernicious $^{40}$K background. Typically, the treating step comprises stirring or mixing the cocktail with the solid potassium absorber; however, in alternative or additional embodiments, the solution or cocktail can be passed through a column of the solid potassium absorber. To speed the removal of potassium, it may be desirable to heat the cocktail-potassium adsorber mixture during the treatment step; for example to at 110° C. or in the range of 105 to 120° C., or below the flash point of the cocktail or any reagents in the cocktail. The solid with adsorbed potassium (and other metals) can be separated by filtration, decanting or centrifugation.

The treatment with a solid potassium adsorber may be conducted on a complete liquid scintillation cocktail or on any neat liquid components of the cocktail, like surfactants, which are typically the vector of contamination for the potassium. Since the treatment removes metals, the sample is not treated; an exception would be where a cocktail, after obtaining a reading, is treated and recycled. Thus, in some embodiments, the invention includes a method of measuring radioactivity of a plurality of samples where the liquid scintillation cocktail is treated with the potassium absorber in a recycling step.

A liquid scintillation cocktail comprises a solvent and a scintillator. In most cases, a surfactant is required to emulsify the aqueous sample (analyte). Other components may include any of the additional components found in liquid scintillation cocktails such as fluors and added wavelength shifters for optimizing response of the photomultipliers in the scintillation detector.

The solvent is typically an organic aromatic solvent and is preferably present in at least 40 mass % of the cocktail, in other embodiments present in the range of 40 to 99 mass %, or 50 to 90% or 50 to 80 mass %. Desirably, the solvent is liquid at laboratory conditions, not excessively volatile, and compatible with the scintillator. In some embodiments, the organic solvent comprises toluene, xylene, phenylcyclohexane, triethylbenzene, pseudocumene, alkylbenzenes, phenylxylxylethane, naphthelenes, decalin, or mixtures thereof. The organic solvent is typically non-polar or low polarity such that the solvent is non-miscible with water. The invention is not limited to particular classes of scintillators. Common scintillators include 2,5-diphenyloxazole (PPO), 2-phenyl-5-biphenyl-1,3,4-oxadiazole (PBP), and butyl-PBP.

The surfactant is preferably present in an amount of 1 mass % or more, more preferably 2 to 40 mass % of the cocktail; or 10 to 40 mass %, or 20 to 40 mass % of the cocktail. The surfactant can be any known surfactant. Typical surfactants may include Triton N35 ((C2H4O) nC14H220·xH3O4P)), dodecylbenzosulfonate, and benzethonium chloride. In one preferred embodiment, the surfactants used include a combination of nonylphenol ethoxylates.

The solid potassium adsorber can be any solid material suitable for removing potassium from solution. Suitable materials include: polymeric amines, aluminosilicates especially zeolites, zirconium phosphate, polyacrylic acid, polystyrenesulphonate, poly(sodium styrene sulfonate), poly(2-acrylamido-2-methyl-1-propanesulfonic acid), chelating resins, iron oxide hydroxide, In some preferred embodiments, the solid potassium absorber comprises an ion exchange resin or zeolite. In especially preferred embodiments, the solid material comprises a sodium or alkaline earth silicate. An especially preferred adsorber comprises magnesium silicate such as sold under the tradename Magnesol®. Preferably, the solid adsorber has a BET surface area of at least 50 $m^2/g$, or at least 100 $m^2/g$, or in the range of 50 to 500 $m^2/g$.

The method preferably uses high surface area, inorganic particulates (e.g., magnesium silicate) for the chemical adsorption and extraction of metal ions (such as potassium) from neat nonpolar and surfactant liquids and mixtures. The purification method provides a solution for creating more radiopure nonpolar liquids, detergents, and/or cocktails that is easily employable by removing the problematic radioisotopes (e.g., $^{40}$K) in those liquid solutions. The method creates an increased radiopure cocktail that allows for better signal-to-noise.

The purification method has been demonstrated to be effective in removal of the background-causing potassium contamination from the cocktail without detriment to the cocktail performance (e.g., light output). The purification method was demonstrated on finished cocktails (typically composed of a mixture of 10+ reagents). Tests were also conducted on neat reagents, specifically the surfactants that are the vector for potassium (K) contamination which typically make up 10-40% of the cocktail by mass. The method worked for the surfactants, as shown in the table below:

| Reagent | factor K removed |
|---|---|
| Surfactant-A | 7.8 |
| Surfactant-B | 8.4 |
| Surfactant-C | 12.1 |
| Surfactant-D | 27.7 |
| Surfactant-E | 9.0 |
| Surfactant-F | 12.8 |

EXAMPLES

We tested four commercial scintillation cocktails in a scintillation counter and found that all exhibited higher decays from $^{40}$K than would be expected. Further study showed that the surfactant component contained about five times higher potassium concentrations than the finished cocktails. For example, we calculated 12,000 $^{40}$K decays/day/spl in the surfactant as compared with 2400 $^{40}$K decays/day/spl in the finished cocktail (which typically contains 20-40 mass % surfactant) based on the amount of potassium measured by ICP-mass spectrometry.

To remove potassium from commercial scintillation cocktails we used a high surface area insoluble inorganic compound, called the "adsorber", (e.g., magnesium silicate) for the chemisorption of trace levels of ionic species (e.g., potassium and hydroxide ions) in surfactant and organic (nonpolar) liquids and/or mixtures. In clean containers, we added the adsorber at a relative weight ratio of 3% to that of the liquid phase followed by vigorously shaking the liquid-adsorber mixture and placing in a 110° C. oven for 30-60 minutes. If needed, incubation temperatures can be lowered. The mixture is removed from the oven and allow to cool. The adsorber was separated from the liquid phase using centrifugation or clean filtration. The treated liquids were stored in clean containers.

In one example, a commercial scintillation cocktail was determined to have 5.30 ppm K, $^{40}K$=160 mBq/kg, 138 decays/day/spl via inductively coupled plasma mass spectrometry. Treatment of the commercial scintillation cocktail according to a method of the invention resulted in 0.14 ppm K, $^{40}K$=4.3 mBq/kg, 3.7 decays/day/spl. This is roughly a 38× reduction in potassium. Other commercial cocktails showed similar reductions with factors of 7-38×.

What is claimed:

1. A method of making a treated liquid scintillation cocktail, comprising:

treating one or more liquid components of a liquid scintillation cocktail with a solid material;

wherein the one or more liquid components comprise a solvent and a surfactant; and wherein the solid material adsorbs potassium from the one or more liquid components to reduce an amount of potassium in the liquid scintillation cocktail by at least seven times; and separating the solid material from the one or more liquid components.

2. The method of claim 1 wherein the one or more liquid components further comprise a scintillator.

3. The method of claim 2 wherein the scintillator comprises 2,5-diphenyloxazole (PPO), 2-phenyl-5-biphenyl-1,3,4-oxadiazole (PBP), or butyl-PBP.

4. The method of claim 1 wherein the liquid scintillation cocktail further comprises a wavelength shifter.

5. The method of claim 1 where the solid material comprises an ion exchange resin or a zeolite.

6. The method of claim 1 where the solid material comprises a sodium silicate or an alkaline earth silicate.

7. The method of claim 1 where the step of treating the one or more liquid components of the liquid scintillation cocktail with a solid material reduces the amount of potassium in the liquid scintillation cocktail by at least ten times, at least twenty times, or in a range of 10 to 40 times.

8. A method of measuring alpha particles or beta particles emitted from a radioactive sample by a liquid scintillation, comprising:

providing a liquid scintillation cocktail or a component of a liquid scintillation cocktail;

treating the liquid scintillation cocktail or the component of the liquid scintillation cocktail with a solid potassium adsorber to form a treated liquid scintillation cocktail or a component of a treated liquid scintillation cocktail;

adding the radioactive sample to the treated liquid scintillation cocktail or the component of the treated liquid scintillation cocktail to form a liquid scintillation cocktail with the radioactive sample; and counting particles emitted by the radioactive sample in the liquid scintillation cocktail with the radioactive sample in a scintillation counter.

9. The method of claim 8 wherein the liquid scintillation cocktail or the component of the liquid scintillation cocktail in the providing step comprises a surfactant.

10. The method of claim 9 wherein the surfactant comprises a combination of nonylphenol ethoxylates.

11. The method of claim 8 wherein the liquid scintillation cocktail or the component of the liquid scintillation cocktail in the providing step comprises at least 2 mass % of a surfactant.

12. The method of claim 8 wherein the solid potassium adsorber comprises a sodium or alkaline earth silicate.

13. A method of measuring alpha particles or beta particles emitted from a plurality of samples by a liquid scintillation, comprising:

counting particles emitted by a first sample in a liquid scintillation cocktail with an incorporated first sample in a scintillation counter;

subsequent to the step of counting the particles, treating the liquid scintillation cocktail with the incorporated first sample with a solid potassium absorber to form a treated liquid scintillation cocktail;

separating the solid potassium absorber from the treated liquid scintillation cocktail; combining a second sample to the treated liquid scintillation cocktail; and counting particles emitted by the second sample in the treated liquid scintillation cocktail in a scintillation counter.

* * * * *